(12) United States Patent
Shimuta

(10) Patent No.: US 12,425,830 B2
(45) Date of Patent: Sep. 23, 2025

(54) WIRELESS COMMUNICATION APPARATUS, WIRELESS COMMUNICATION SYSTEM, CONNECTION METHOD FOR WIRELESS COMMUNICATION APPARATUS, PROGRAM, AND STORAGE MEDIUM

(71) Applicant: Murata Manufacturing Co., Ltd., Nagaokakyo (JP)

(72) Inventor: Toru Shimuta, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 404 days.

(21) Appl. No.: 18/066,678

(22) Filed: Dec. 15, 2022

(65) Prior Publication Data

US 2023/0116304 A1    Apr. 13, 2023

Related U.S. Application Data

(63) Continuation of application No. PCT/JP2021/014328, filed on Apr. 2, 2021.

(30) Foreign Application Priority Data

Jun. 26, 2020 (JP) ................................ 2020-110397

(51) Int. Cl.
*H04W 8/00* (2009.01)
*H04B 17/318* (2015.01)
*H04W 60/04* (2009.01)

(52) U.S. Cl.
CPC .......... *H04W 8/005* (2013.01); *H04B 17/318* (2015.01); *H04W 60/04* (2013.01)

(58) Field of Classification Search
None
See application file for complete search history.

(56) References Cited

U.S. PATENT DOCUMENTS

2012/0263059 A1\* 10/2012 Kim .................. H04W 36/0088
    370/252
2015/0131460 A1\* 5/2015 Sridhara ............... H04W 48/20
    370/252

(Continued)

FOREIGN PATENT DOCUMENTS

JP      558080939 A    5/1983
JP    2007288722 A   11/2007

(Continued)

OTHER PUBLICATIONS

International Search Report in PCT/JP2021/014328, mailed on Jun. 22, 2021, 4 pages.

*Primary Examiner* — Anh Vu H Ly
(74) *Attorney, Agent, or Firm* — ArentFox Schiff LLP

(57) ABSTRACT

A wireless communication apparatus is provided for preventing connection to an unintended wireless communication device. The apparatus includes a controller unit that performs scanning for the wireless communication device and connecting to the wireless communication device; and a memory unit that stores a first threshold for determining whether to connect to the wireless communication device. Moreover, the first threshold relates to an increasing amount per unit time of a received signal strength indicator of a signal from the wireless communication device. In the scanning, the controller unit connects to the wireless communication device when the increasing amount per unit time of the received signal strength indicator of the signal received from the wireless communication device is higher than or equal to the first threshold.

18 Claims, 7 Drawing Sheets

(56) References Cited

U.S. PATENT DOCUMENTS

| | | | |
|---|---|---|---|
| 2015/0373749 A1* | 12/2015 | Palin | H04W 76/10 |
| | | | 455/41.2 |
| 2016/0183181 A1* | 6/2016 | Lee | H04W 48/20 |
| | | | 370/338 |
| 2017/0064536 A1* | 3/2017 | Katar | H04W 8/02 |
| 2017/0064618 A1* | 3/2017 | Katar | H04L 43/16 |
| 2017/0353428 A1 | 12/2017 | Yamato | |
| 2018/0335987 A1 | 11/2018 | Tokumoto | |
| 2020/0029271 A1* | 1/2020 | Sood | H04B 17/318 |
| 2020/0037392 A1* | 1/2020 | Qui | H04L 67/535 |
| 2020/0245168 A1* | 7/2020 | Ketonen | H04L 43/55 |

FOREIGN PATENT DOCUMENTS

| | | |
|---|---|---|
| JP | 2011029730 A | 2/2011 |
| JP | 2011139357 A | 7/2011 |
| JP | 2014175972 A | 9/2014 |
| JP | 2016092469 A | 5/2016 |
| JP | 2017157991 A | 9/2017 |
| JP | 2017220751 A | 12/2017 |
| JP | 2018196025 A | 12/2018 |

* cited by examiner

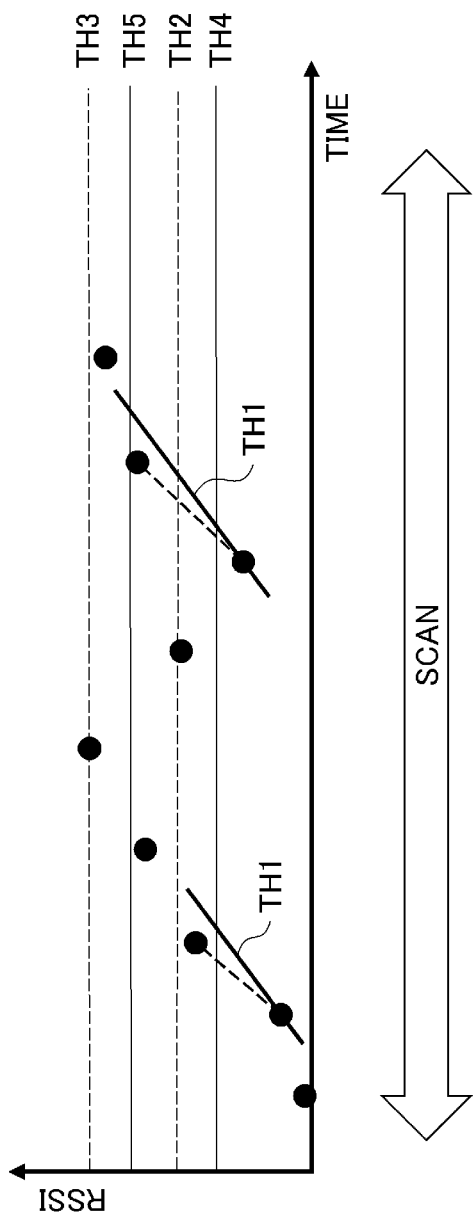

WIRELESS COMMUNICATION APPARATUS, WIRELESS COMMUNICATION SYSTEM, CONNECTION METHOD FOR WIRELESS COMMUNICATION APPARATUS, PROGRAM, AND STORAGE MEDIUM

CROSS REFERENCE TO RELATED APPLICATIONS

This application is a continuation of PCT Application No. PCT/JP2021/014328, filed Apr. 2, 2021, which claims priority to Japanese Patent Application No. 2020-110397, filed Jun. 26, 2020, the entire contents of each of which are hereby incorporated by reference in their entirety.

TECHNICAL FIELD

The present invention relates to a wireless communication apparatus, a wireless communication system, a connection method for a wireless communication apparatus, a program, and a storage medium.

BACKGROUND

Japanese Patent Application Publication No. 2011-139357 (hereinafter "Patent Document 1") discloses a wireless communication terminal, such as a mobile phone, that performs wireless communication with an access point such as a base station. When the quality of communication with the access point is deteriorated, this wireless communication terminal performs scanning to search for a different access point. When finding an access point having a higher quality of communication, the wireless communication terminal performs handover to change connection to the access point. In the scanning, the strength of a radio wave received from the access point (e.g., a received signal strength indicator: RSSI) is used as an index for the quality of communication with an access point.

There is known a wireless communication system in which wireless communication is performed between a wireless communication apparatus (a central apparatus or a master apparatus), such as a smartphone, and a wireless communication device (a peripheral device or a slave device) such as a sensor device in accordance with what is called a short-range communication standard such as Bluetooth® or Wi-Fi®. Such a wireless communication apparatus performs scanning for the wireless communication device and wirelessly communicates with a wireless communication device by performing connection to the wireless communication device.

However, when a method by which whether to perform connection is determined based on a received signal strength indicator in the scanning as in Patent Document 1 is used, the presence of a plurality of wireless communication devices, if any, causes a wireless communication apparatus to be connected to an unintended wireless communication device on occasions. This is because the received signal strength indicator is not necessarily proportional to a distance between a wireless communication device and the wireless communication apparatus due to the presence of an obstacle between the wireless communication device and the wireless communication apparatus, the anisotropy of the received signal strength indicator (e.g., a positional relationship of the enclosure or the circuit board of the wireless communication device), or the like.

SUMMARY OF THE INVENTION

Accordingly, an exemplary embodiment of the present invention provides a wireless communication apparatus, a wireless communication system, a connection method for a wireless communication apparatus, a program, and a storage medium that prevents connection to an unintended wireless communication device.

In an exemplary aspect, a wireless communication apparatus is provided that wirelessly communicates with a wireless communication device and that includes a controller unit that performs scanning for the wireless communication device and wirelessly communicates with the wireless communication device by performing connection to the wireless communication device; and further includes a memory unit that stores a first threshold that is a threshold for determining whether to connect to the wireless communication device. In this aspect, the first threshold relates to an increasing amount per unit time of a received signal strength indicator of a signal from the wireless communication device. In the scanning, the controller unit performs the connection to the wireless communication device satisfying a condition (1) as follows.

(1) The increasing amount per unit time of the received signal strength indicator of the signal received from the wireless communication device is higher than or equal to the first threshold.

Moreover, a wireless communication system is provided according to an exemplary aspect that includes the wireless communication apparatus described above; and a server apparatus that communicates with the wireless communication apparatus. The signal received from the wireless communication device includes an identification of the wireless communication device. The server apparatus stores the identification of the wireless communication device as registration information indicating that the wireless communication device has been registered. In the scanning, the controller unit performs the connection to the wireless communication device satisfying the one or more conditions and a condition (5) as follows.

(5) The identification included in the signal received from the wireless communication device has been registered in the registration information stored in the server apparatus.

In another exemplary aspect, a different wireless communication system is provided that includes the wireless communication apparatus described above; and a wireless communication device that wirelessly communicates with the wireless communication apparatus. When being connected to the wireless communication apparatus, the wireless communication device notifies that the wireless communication device is connected to the wireless communication apparatus.

In addition, a connection method for a wireless communication apparatus according to an exemplary aspect is provided for wirelessly communicating with a wireless communication device by performing connection to the wireless communication device. In this aspect, the method includes: performing scanning for the wireless communication device; and performing connection to the wireless communication device satisfying the condition (1) as follows.

(1) The increasing amount per unit time of the received signal strength indicator of the signal received from the wireless communication device is higher than or equal to the first threshold.

In another exemplary aspect, a program is provided that causes a computer to perform: scanning for a wireless communication device; and connection to the wireless communication device satisfying the condition (1) as follows.

(1) The increasing amount per unit time of the received signal strength indicator of the signal received from the wireless communication device is higher than or equal to the first threshold.

In another exemplary aspect, a storage medium is provided according to the present invention is a computer readable storage medium storing the program described above.

According to the exemplary aspects of the present invention, connection to an unintended wireless communication device can be prevented in the wireless communication apparatus.

BRIEF DESCRIPTION OF DRAWINGS

FIG. 7 is a view illustrating an example of the received signal strength indicator of a signal received by a wireless communication apparatus according to a third exemplary embodiment.

DETAILED DESCRIPTION OF EMBODIMENTS

Figure 1:
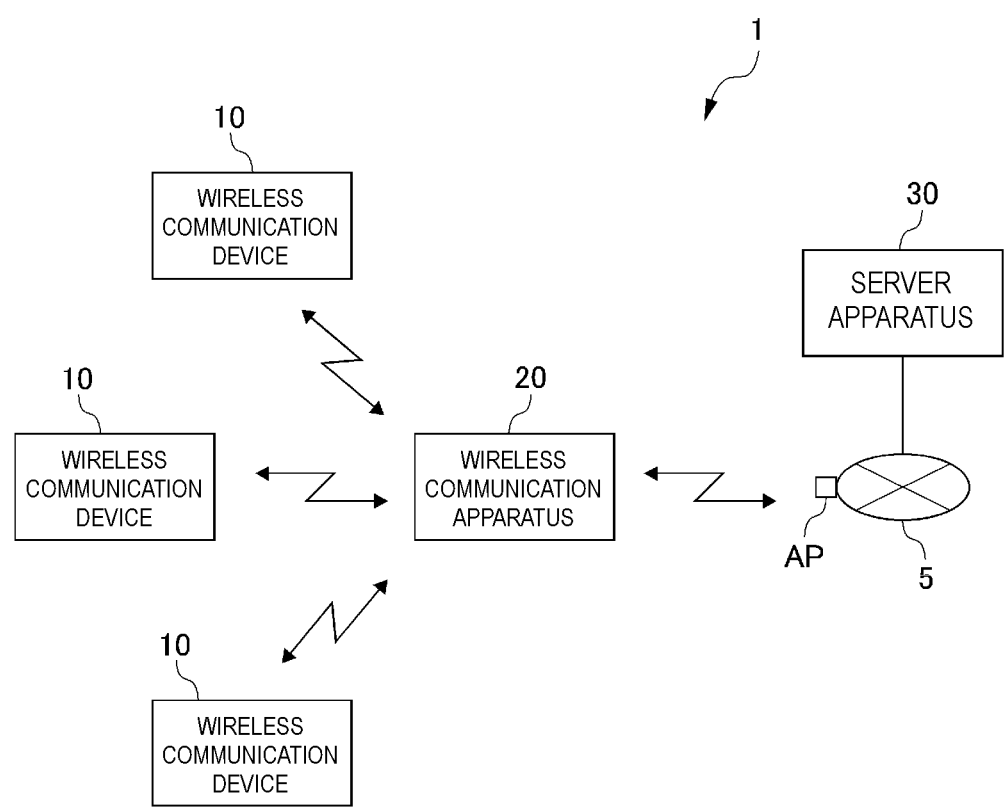
FIG. 1 is a view illustrating a wireless communication system according to a first exemplary embodiment.

Hereinafter, an example of exemplary embodiments will be described with reference to the accompanying drawings. Note that the same or equivalent portions are denoted by the same reference numerals throughout the drawings.

First Exemplary Embodiment

<Wireless Communication System>

FIG. 1 is a view illustrating a wireless communication system according to the first exemplary embodiment. As shown, a wireless communication system 1 according to an exemplary aspect includes one or more wireless communication devices 10, a wireless communication apparatus 20, and a server apparatus 30. In the wireless communication system 1, wireless communication is performed between the wireless communication apparatus 20 (e.g., a central apparatus or a master apparatus) and any of the wireless communication devices 10 (e.g., a peripheral device or a slave device) in accordance with what is called a short-range communication standard such as Bluetooth® or Wi-Fi®. In the wireless communication system 1, communication is performed between the wireless communication apparatus 20 and the server apparatus 30, for example, with a network 5 interposed therebetween.

According to an exemplary aspect, the wireless communication device 10 can be a sensor device, such as an electrocardiograph, an electroencephalograph, a sphygmomanometer, plethysmograph, a continuous positive airway pressure (CPAP), a heart rate meter, an oxygen saturation meter (pulse oximeter), a clinical thermometer, a blood glucose meter, a blood flowmeter, an electromyograph, a body surface thermometer, an activity tracker, a sweat meter, an autonomic nerve activity meter, a sleep monitor, a positional information device (e.g., global positioning system: GPS), a barometer, a thermometer, a hygrometer, a Wet Bulb Globe Temperature (WBGT) meter, an illuminometer, or a noise meter. Moreover, the wireless communication device 10 can also be a peripheral device, such as a camera, a microphone, a speaker, a printer, or a display. Note that the wireless communication device 10 is not limited to these types of devices and may be any of various devices capable of functioning as the peripheral device.

The wireless communication device 10 is configured to wirelessly communicate with the wireless communication apparatus 20 by performing connection to the wireless communication apparatus 20 and to transmit information to the wireless communication apparatus 20. As a wireless communication standard, what is called a short-range communication standard such as Bluetooth or Wi-Fi is cited, as described above. Note that the wireless communication standard is not limited to this. In the following description, Bluetooth Low Energy (BLE) is exemplified among these.

When being connected to the wireless communication apparatus 20, the wireless communication device 10 is configured to transmit an advertising signal (e.g., advertising). The signal may include the identification of the wireless communication device 10. For example, in the case of BLE, the advertising signal includes a device name as the identification.

When being connected to the wireless communication apparatus 20, the wireless communication device 10 can also be configured to notify a user that the wireless communication device 10 is connected to the wireless communication apparatus 20. The wireless communication device 10 may also notify the user that the wireless communication device 10 is connected to the wireless communication apparatus 20 at present, in accordance with an instruction from the wireless communication apparatus 20. The means of notification is not particularly limited, and a display that makes a notification using a character or the like, a speaker that makes a notification using sound such as a buzzer, a light-emitting device such as a LED that makes a notification using light such as emitted, blinking, or color light, and the like are cited.

As the wireless communication apparatus 20, an apparatus, such as a smartphone, a tablet, or a PC, can be provided. Note that the wireless communication apparatus 20 is not limited to this type of device and may be any of various information processing apparatuses capable of functioning as a central apparatus.

The wireless communication apparatus 20 is configured to wirelessly communicate with the wireless communication device 10 by performing connection to the wireless communication device 10 and to receive information from the wireless communication device 10. The wireless communication apparatus 20 also communicates with the server apparatus 30 with the network 5 interposed therebetween, transmits information to the server apparatus 30, and receives information from the server apparatus 30. The details of the wireless communication apparatus 20 will be described later.

Note that at least one of the wireless communication device 10 or the wireless communication apparatus 20 each of which is described above is portable. For example, even if the wireless communication device 10 is a stationary device (such as a wireless camera, an indoor temperature and humidity sensor, or a printer), it suffices that the wireless communication apparatus 20 is a portable apparatus such as a smartphone or a tablet. Even if the wireless communication apparatus 20 is a stationary apparatus (such as a gateway), it suffices that the wireless communication device 10 is any of various wearable sensors or the like.

Moreover, the server apparatus 30 is connected to the wireless communication apparatus 20 with the network 5 interposed therebetween, receives information from the wireless communication apparatus 20, and transmits information to the wireless communication apparatus 20. As the server apparatus 30, an information processing apparatus such as a PC or a large scale computer is cited.

The server apparatus 30 is configured to manage various pieces of information received from a plurality of wireless communication apparatuses 20. The server apparatus 30 may also store the identification of the wireless communication device 10 as registration information indicating that the wireless communication device 10 has been registered.

<<Wireless Communication Apparatus>>

Figure 2:
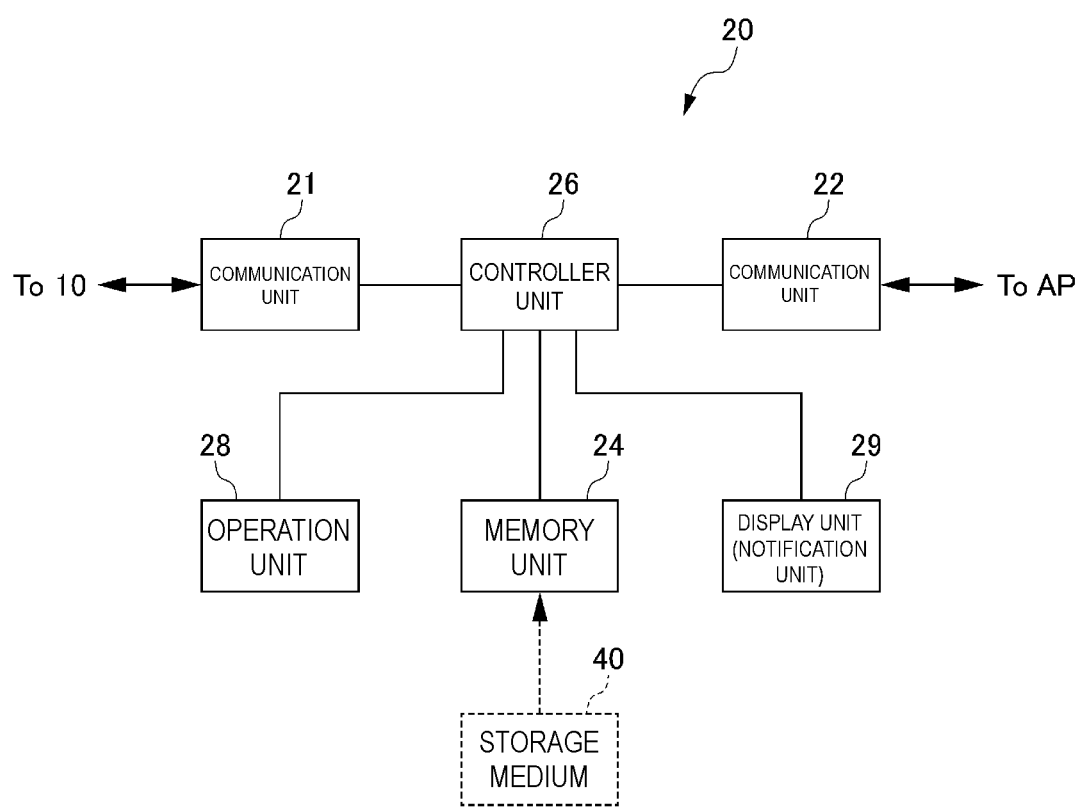
FIG. 2 is a view illustrating a wireless communication apparatus according to the first exemplary embodiment in the wireless communication system illustrated in FIG. 1.

Hereinafter, the wireless communication apparatus 20 will be described in detail. FIG. 2 is a view illustrating a wireless communication apparatus according to this embodiment. The wireless communication apparatus 20 illustrated in FIG. 2 includes a communication unit 21, a communication unit 22, a memory unit 24, a controller unit 26, an operation unit 28, and a display unit (e.g., a notification unit) 29.

The communication unit 21 wirelessly communicates with the wireless communication device 10. In particular, the communication unit 21 is an interface conforming to what is called a short-range communication standard, such as Bluetooth or Wi-Fi. Note that the communication standard to which the communication unit 21 conforms is not limited to this type of standard. In the following description, Bluetooth Low Energy (BLE) is also exemplified among the standards.

The communication unit 22 communicates with the server apparatus 30, for example, with an access point AP and the network 5 interposed therebetween. The communication unit 22 is an interface that performs wireless communication in accordance with a communication standard such as a wireless local area network (LAN), long term evolution (LTE), or 3G. Note that the communication unit 21 is not limited to this and may be an interface that performs wired communication in accordance with a communication standard such as a wired LAN or the like. In the following description, a mode in which the wireless communication is performed with the access point AP and the network 5 interposed therebetween in accordance with the wireless LAN and the wired LAN is exemplified among these.

The system described herein is configured to prevent the wireless communication apparatus 20 from performing connection to an unintended wireless communication device 10, causing the wireless communication apparatus 20 to distinguish (identify) one of the wireless communication devices 10 that is a connection target, in response to:

(A1) the user intentionally starting the connection target wireless communication device 10, (A2) the user intentionally and gradually cancelling the radio shielding of the connection target wireless communication device 10 in such a manner as to take the connection target wireless communication device 10 out of the radio shield object such as a metal case, or (A3) the user intentionally bringing the connection target wireless communication device 10 relatively close to the wireless communication apparatus 20. Note that in "bringing the wireless communication device 10 relatively close to the wireless communication apparatus 20", the wireless communication device 10 may be moved with the wireless communication apparatus 20 fixed, or the wireless communication apparatus 20 may be moved with the wireless communication device 10 fixed. Alternatively, both the wireless communication device 10 and the wireless communication apparatus 20 may be moved.

Figure 3:
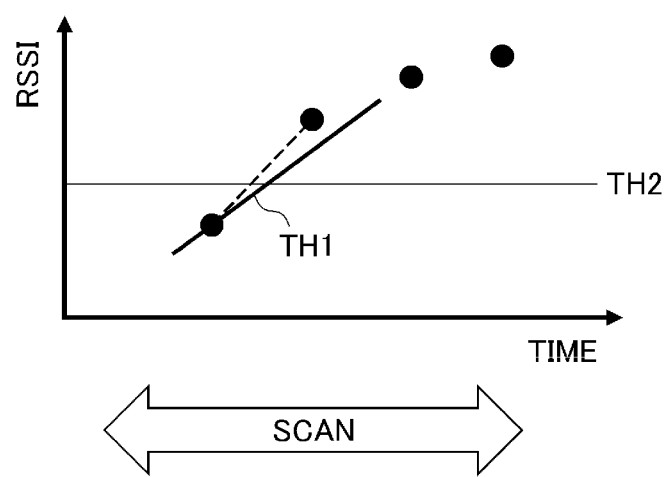
FIG. 3 is a view illustrating an example of a received signal strength indicator of a signal received by the wireless communication apparatus according to the first exemplary embodiment.

FIG. 3 is a view illustrating an example of the received signal strength indicator of a signal received by the wireless communication apparatus according to the first embodiment. In FIG. 3, the horizontal axis represents time, and the vertical axis represents received signal strength indicator (RSSI). As illustrated in FIG. 3, in the case of (A1), (A2), or (A3) above, the received signal strength indicator of the signal received by the wireless communication apparatus 20 gradually increases. In the wireless communication apparatus 20 according to the first embodiment, the controller unit 26 and the memory unit 24 are configured as follows.

In particular, the memory unit 24 stores a first threshold TH1 and a second threshold TH2 that are for determining whether to connect to the wireless communication device 10.

As illustrated in FIG. 3, the first threshold TH1 relates to an increasing amount per unit time of the received signal strength indicator of the signal from the wireless communication device 10. In this aspect, it suffices that the first threshold TH1 is, for example, 10 dBm/sec. or higher and is 400 dBm/sec. or lower (0.01 nW/sec. or higher and 10 μW/sec. or lower), preferably, is 20 dBm/sec. or higher and is 200 dBm/sec. or lower (0.1 nW/sec. or higher and 1 μW/sec. or lower), and more preferably, is 40 dBm/sec. or higher and is 100 dBm/sec. or lower (1 nW/sec. or higher and 100 nW/sec. or lower). However, it is noted that the first threshold TH1 is not limited to this and may be set appropriately in consideration of (A1), (A2), or (A3) above.

The second threshold TH2 relates to the received signal strength indicator of the signal from the wireless communication device 10. It suffices that the second threshold TH2 is, for example, −90 dBm or higher and is −50 dBm or lower, that is, a level allowing communication even if a distance between the wireless communication device 10 and the wireless communication apparatus 20 or a communication state fluctuates to some extent and preferably, is −80 dBm or higher and is −60 dBm or lower. Note that the second threshold TH2 is not limited to this and may be set appropriately in consideration of (A1), (A2), or (A3) above.

The memory unit 24 also stores a program (e.g., a software application) to be executed by the controller unit 26 or data. The memory unit 24 is composed of a read only memory (ROM), a hard disk drive (HDD), a solid state drive (SSD), or a storage medium such as an attachable/detachable memory card.

Referring back to FIG. 2, the controller unit 26 is configured to perform scanning for one of the wireless communication devices 10 and wirelessly communicates with the wireless communication device 10 by performing connection to the wireless communication device 10. In the scanning, the controller unit 26 performs the connection to the wireless communication device 10 satisfying a condition (1) below and a condition (2) below.

(1) The increasing amount per unit time of the received signal strength indicator of the signal received from the wireless communication device 10 is higher than or equal to the first threshold TH1.

(2) The received signal strength indicator of the signal received from the wireless communication device 10 is higher than or equal to the second threshold TH2.

Further, the controller unit 26 may be configured to perform connection to a wireless communication device 10 satisfying a condition (5) below in addition to the condition (1) above and the condition (2) above.

(5) An identification (for example, a device name) included in the signal received from the wireless communication device 10 has been registered in the registration information stored in the server apparatus 30.

Moreover, the registration information may be downloaded in advance from the server apparatus 30 to the wireless communication apparatus 20 or may be automatically updated appropriately.

The controller unit 26 may be configured to instruct the wireless communication device 10 to notify the user that the wireless communication apparatus 20 and the wireless communication device 10 are connected at present.

If the wireless communication device satisfying the condition (1) above and the condition (2) above (further, the condition (5) above) is not found despite the scanning performed for a predetermined time, the controller unit 26 may also stop the connection standby state in which a standby for the connection to the wireless communication device is performed. For purposes of this disclosure, the phrase "stopping the connection standby state" is not limited to stopping scanning and includes continuing the scanning but not connecting to the wireless communication device satisfying the connection conditions above despite detection of the wireless communication device.

In general, the controller unit 26 can be composed of an operation processor, such as a central processing unit (CPU), a digital signal processor (DSP), or a field-programmable gate array (FPGA). The functions of the controller unit 26 are implemented by running a program (e.g., a software application) stored, for example, in the memory unit 24. The program (e.g., a software application) may be provided via a network or may be provided in such a manner as to be recorded in a computer readable storage medium 40 such as a compact disc read only memory (CD-ROM) or a digital versatile disc (DVD). As the storage medium, a non-transitory tangible media is cited.

The operation unit 28 is an operation unit on which the user performs operation. The operation unit 28 is composed of, for example, a keyboard, a mouse, a user interface or the like having one or more physical operation buttons or a touch panel or the like having one or more virtual operation buttons.

The display unit 29 is a notification unit that notifies the user of information. The display unit 29 is composed of, for example, a liquid crystal display or an organic EL display. Note that the notification unit is not limited to this and may be a speaker that makes a notification using sound such as a buzzer, a light-emitting device such as a LED that makes a notification using light such as emitted, blinking, or color light, or the like.

The display unit (e.g., notification unit) 29 can be configured to notify the user that the wireless communication apparatus 20 and a wireless communication device are connected or that the wireless communication apparatus 20 and a wireless communication device are not connected. The display unit (e.g., notification unit) 29 may also notify the user that the wireless communication device stops the connection standby state if the wireless communication device satisfying the connection conditions above is not found despite the scanning performed for the predetermined time, as described above.

Figure 4:
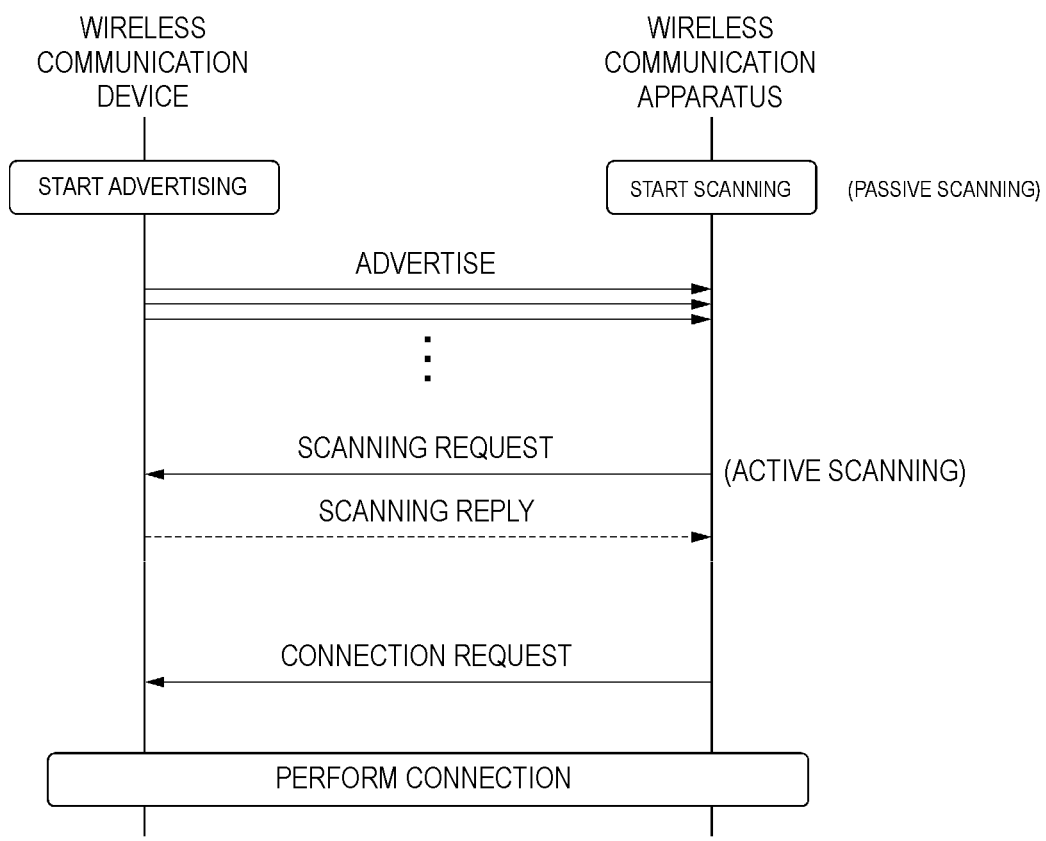
FIG. 4 is a state transition diagram of connection operations performed by the wireless communication system according to the first exemplary embodiment.

Connection operations by the wireless communication system 1 and the wireless communication apparatus 20 that are described above will then be described with reference to FIG. 3 to FIG. 5. FIG. 4 is a state transition diagram of the connection operations by the wireless communication system according to the first embodiment, and FIG. 5 is a flowchart of the connection operations by the wireless communication apparatus according to the first exemplary embodiment.

Figure 5:
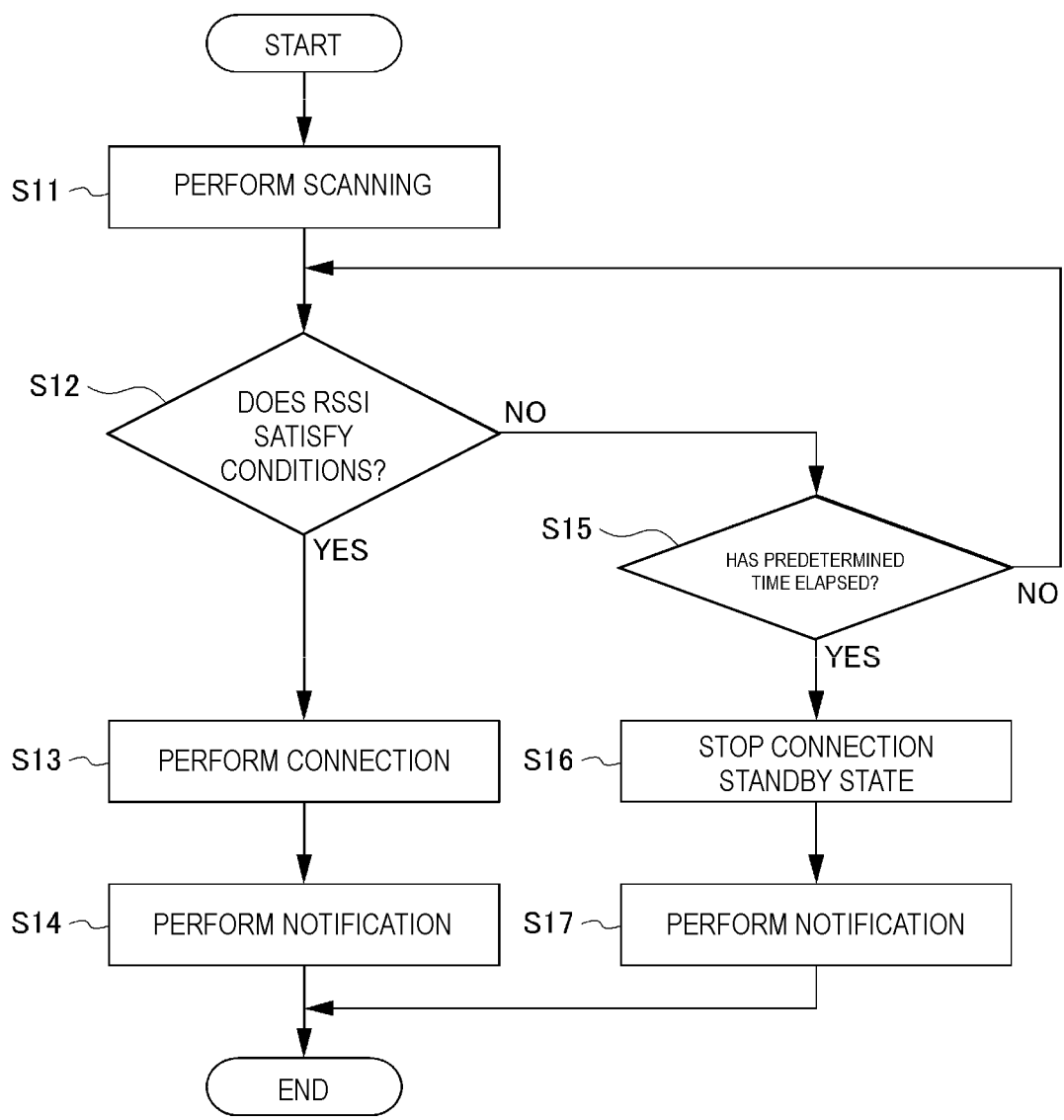
FIG. 5 is a flowchart of connection operations performed by the wireless communication apparatus according to the first exemplary embodiment.

First, as illustrated in FIG. 4, the controller unit 26 in the wireless communication apparatus 20 performs scanning for one of the wireless communication devices 10 (S11 in FIG. 5). In an exemplary aspect, the scanning can be performed for the predetermined time (for example, in a range from 5 sec. to 15 sec.). The scanning by the controller unit 26 may be performed automatically when the wireless communication apparatus 20 is started or in response to the user performing operation for starting the scanning. For example, the scanning by the controller unit 26 may be performed automatically when the user launches application software in the wireless communication apparatus 20.

In the scanning for the wireless communication device 10, the user starts the connection target wireless communication device 10. The wireless communication device 10 then automatically performs advertising when being started and starts transmitting an advertising signal. At this time, as illustrated in FIG. 3, the received signal strength indicator of the signal received by the wireless communication apparatus 20 gradually increases. For example, since the wireless communication apparatus 20 receives a signal having not been received to date, it appears that the received signal strength indicator has increased with respect to a detection limit value.

Alternatively, the user gradually cancels the radio shielding of the connection target wireless communication device 10 in such a manner as to take the connection target wireless communication device 10 having been started and transmitted the advertising signal out of the radio shield object such as a metal case. At this time, as illustrated in FIG. 3, the received signal strength indicator of the signal received by the wireless communication apparatus 20 gradually increases. For example, as described above, since the wireless communication apparatus 20 receives a signal having not been received to date, it appears that the received signal strength indicator has increased with respect to the detection limit value.

Alternatively, the user brings the connection target wireless communication device 10 having been started and transmitted the advertising signal relatively close to the wireless communication apparatus 20. At this time, as illustrated in FIG. 3, the received signal strength indicator of the signal received by the wireless communication apparatus 20 gradually increases.

In the scanning for the wireless communication device 10, the controller unit 26 in the wireless communication apparatus 20 determines whether the condition (1) below and the condition (2) below are satisfied (S12 in FIG. 5).

(1) The increasing amount per unit time of the received signal strength indicator of the signal received from the wireless communication device 10 is higher than or equal to the first threshold TH1.

(2) The received signal strength indicator of the signal received from the wireless communication device 10 is higher than or equal to the second threshold TH2.

Further, the controller unit 26 may perform connection to a wireless communication device 10 satisfying the condition (5) as described above in addition to the condition (1) above and the condition (2) above.

(5) The identification (for example, a device name) included in the signal received from the wireless communication device 10 has been registered in the registration information stored in the server apparatus 30.

If there is a wireless communication device 10 satisfying the condition (1) above and the condition (2) above (further, the condition (5) below), the controller unit 26 performs connection to the wireless communication device 10 (S13 in FIG. 5).

It is noted that as in BLE as an example illustrated in FIG. 4, the wireless communication apparatus 20 can be configured to perform active scanning after the passive scanning described above and thus may obtain additional information from the wireless communication device 10. For example, the wireless communication apparatus 20 transmits a scanning request to the connection target wireless communication device 10 and receives a scanning reply (including the additional information) from the connection target wireless communication device 10. The wireless communication apparatus 20 then transmits a connection request, and the wireless communication apparatus 20 and the wireless communication device 10 are connected.

When the wireless communication apparatus 20 and the wireless communication device 10 are connected, the display unit (e.g., notification unit) 29 in the wireless communication apparatus 20 may notify the user of the connection to the wireless communication device 10 (S14 in FIG. 5). The wireless communication device 10 may also notify the user of the connection to the wireless communication apparatus 20.

It is also noted that the notification function of the wireless communication device 10 typically has a time limit for low power consumption on occasions. The controller unit 26 may thus instruct the wireless communication device 10 to notify the user that the wireless communication apparatus 20 and the wireless communication device 10 are connected at present. In accordance with the instruction from the wireless communication apparatus 20, the wireless communication device 10 may notify again that the wireless communication device 10 is connected to the wireless communication apparatus 20 at present.

In contrast, if there is not a wireless communication device 10 satisfying the condition (1) above and the condition (2) above (further, the condition (5) above) in step S12 in FIG. 5, the controller unit 26 determines whether the predetermined time has elapsed since the scanning (S15 in FIG. 5). If the predetermined time has not elapsed since the scanning, the processing returns to step S12 described above, and the scanning is continued.

In contrast, if the predetermined time has elapsed since the scanning, the processing proceeds to step S16. In other words, if the wireless communication device satisfying the condition (1) above and the condition (2) above (further, the condition (5) above) is not found despite the scanning performed for the predetermined time, the controller unit 26 stops the connection standby state in which a standby for the connection to the wireless communication device is performed (S16 in FIG. 5) in an exemplary aspect.

When the connection standby state is stopped, the display unit (notification unit) 29 may notify the user that the connection standby state is stopped (S17 in FIG. 5).

As described above, according to the wireless communication apparatus 20 of the first exemplary embodiment, the connection to the wireless communication device 10 satisfying the condition (1) below is performed in the scanning.

(1) The increasing amount per unit time of the received signal strength indicator of the signal received from the wireless communication device 10 is higher than or equal to the first threshold TH1.

This configuration enables the wireless communication apparatus 20 to perform connection to:

(A1) the connection target wireless communication device 10 intentionally started by the user;

(A2) the connection target wireless communication device 10 the radio shielding of which is gradually cancelled by the user intentionally; or (A3) the connection target wireless communication device 10 brought relatively close to the wireless communication apparatus 20 by the user intentionally. The connection to an unintended wireless communication device can thus be prevented.

By the way, if an unintended wireless communication device in the distance is started by chance during the scanning, the wireless communication apparatus 20 is likely to perform connection to the unintended wireless communication device.

In this respect, according to the wireless communication apparatus 20 of the first embodiment, connection to the wireless communication device 10 satisfying the condition (1) above and the condition (2) below is performed in the scanning.

(2) The received signal strength indicator of the signal received from the wireless communication device 10 is higher than or equal to the second threshold.

The wireless communication apparatus 20 thus does not perform connection to the unintended wireless communication device that is started in the distance and the signal strength of which has a large increasing amount per unit time but is low. Moreover, the wireless communication apparatus 20 can be configured to perform connection to the connection target wireless communication device 10 that is started nearby by the user intentionally and the signal strength of which has a large increasing amount per unit time and is high. The connection to the unintended wireless communication device can thus be prevented more.

According to the wireless communication apparatus 20 of the first embodiment, connection to the wireless communication device 10 satisfying the condition (5) below in addition to the condition (1) above and the condition (2) above may be performed in the scanning.

(5) The identification (for example, a device name) included in the signal received from the wireless communication device 10 has been registered in the registration information stored in the server apparatus 30.

This configuration prevents connection to an unintended wireless communication device having not been registered.

In addition, the server apparatus 30 stores registration information regarding a wireless communication device, and the wireless communication apparatus 20 downloads the registration information regarding the wireless communication device from the server apparatus 30 and then updates the registration information. This configuration eliminates the need to input the registration information regarding the wireless communication device in the wireless communication apparatus 20.

According to the wireless communication apparatus 20 of the first embodiment, if the wireless communication device satisfying the condition (1) above and the condition (2) above (further, the condition (5) above) is not found despite the scanning performed for the predetermined time, the connection standby state in which the standby for the connection to the wireless communication device is performed may be stopped. Continuing the connection standby state until the wireless communication device satisfying the connection conditions is detected prevents detection of a wireless communication device satisfying the connection conditions by chance and thus the connection to the unintended wireless communication device.

According to the wireless communication apparatus 20 of the first exemplary embodiment, the user may be notified that the connection standby state is stopped. This configuration enables the user to perform a connection operation again. Accordingly, risk to perform connection to an unintended wireless communication device can be reduced, and connection to an intended wireless communication device can be performed reliably.

According to the wireless communication device 10 of the first exemplary embodiment, the user may be notified that the connection to the wireless communication apparatus 20 is performed. This configuration enables the user to verify which one of a plurality of wireless communication devices, if any, is connected.

According to the wireless communication apparatus 20 of the first embodiment, the wireless communication device 10 may be instructed to notify the user that the wireless communication apparatus 20 and the wireless communication device 10 are connected at present. Typically, the notification function of the wireless communication device 10 has a time limit for low power consumption on occasions. In this respect, if the wireless communication apparatus 20 gives an instruction, and if the wireless communication device 10 thereby makes a notification again, the user having overlooked the notification function of the wireless communication device 10 can verify which one of the plurality of wireless communication devices is connected.

Second Exemplary Embodiment

In the first embodiment described above, the wireless communication apparatus 20 is configured to be prevented from performing connection to an unintended wireless communication device 10, causing the wireless communication apparatus 20 to distinguish (e.g., identify) the connection target wireless communication device 10 in response to:
(A1) the user intentionally starting the connection target wireless communication device 10,
(A2) the user intentionally and gradually cancelling the radio shielding of the connection target wireless communication device 10 in such a manner as to take the connection target wireless communication device 10 out of the radio shield object such as a metal case, or
(A3) the user intentionally bringing the connection target wireless communication device 10 relatively close to the wireless communication apparatus 20.

In the first exemplary embodiment described above, the wireless communication apparatus 20 has performed the connection to the wireless communication device 10 satisfying the condition (1) below and the condition (2) below in the scanning.

(1) The increasing amount per unit time of the received signal strength indicator of the signal received from the wireless communication device 10 is higher than or equal to the first threshold TH1.

(2) The received signal strength indicator of the signal received from the wireless communication device 10 is higher than or equal to the second threshold TH2.

In a second exemplary embodiment, the wireless communication apparatus 20 is configured to be prevented from performing connection to an unintended wireless communication device 10, causing the wireless communication apparatus 20 to distinguish (e.g., identify) a connection target wireless communication device 10 in response to:

(B) the user intentionally bringing the connection target wireless communication device 10 relatively close to and away from the wireless communication apparatus 20, that is, repeatedly bringing the connection target wireless communication device 10 relatively close to the wireless communication apparatus 20. For purposes of this disclosure, it is noted that in "bringing the wireless communication device 10 relatively close to and away from the wireless communication apparatus 20", the wireless communication device 10 may be moved with the wireless communication apparatus 20 fixed, or the wireless communication apparatus 20 may be moved with the wireless communication device 10 fixed. Alternatively, both the wireless communication device 10 and the wireless communication apparatus 20 may be moved.

Hence, in the second exemplary embodiment, the wireless communication apparatus 20 is configured to perform connection to a wireless communication device 10 satisfying a condition (3) below instead of the condition (2) above in the scanning, that is, the wireless communication device 10 satisfying the condition (1) above and the condition (3) below.

(3) The maximum value of the received signal strength indicator of the signal received from the wireless communication device 10 is higher than or equal to a third threshold.

The configurations of the wireless communication system 1 and the wireless communication apparatus 20 according to the second exemplary embodiment are the same as the configurations of the wireless communication system 1 and the wireless communication apparatus 20 according to the first embodiment illustrated in FIG. 1 and FIG. 2. It is noted that in the second embodiment, the functions and the operations of the controller unit 26 and the memory unit 24 in the wireless communication apparatus 20 are different from those in the first exemplary embodiment described above.

Figure 6:
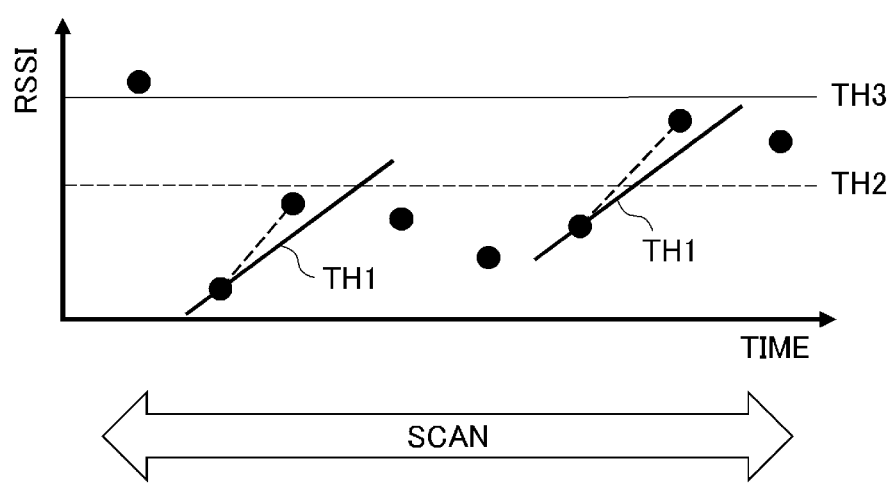
FIG. 6 is a view illustrating an example of the received signal strength indicator of a signal received by a wireless communication apparatus according to a second exemplary embodiment.

FIG. 6 is a view illustrating an example of the received signal strength indicator of a signal received by a wireless communication apparatus according to the second embodiment. In FIG. 6, the horizontal axis represents time, and the vertical axis represents received signal strength indicator (RSSI). As illustrated in FIG. 6, in the case of (B) above, the received signal strength indicator of the signal received by the wireless communication apparatus 20 increases and decreases.

As described above, when the connection target wireless communication device 10 is brought relatively close to and away from the wireless communication apparatus 20 as in (B) above, it is expected that the received signal strength indicator in the wireless communication apparatus 20 is stabilized and does not become high. It is thus conceived that the wireless communication apparatus 20 makes a wrong determination.

In this respect, in the second exemplary embodiment, once the maximum value of the received signal strength indicator of a wireless communication device 10 exceeds the third threshold within the predetermined time during the scanning, the wireless communication apparatus 20 performs connection to the wireless communication device 10.

Specifically, the memory unit 24 in the wireless communication apparatus 20 stores, as the threshold for determining whether to connect to a wireless communication device 10, a third threshold TH3 instead of the second threshold TH2 described above. As illustrated in FIG. 6, the third threshold TH3 relates to the received signal strength indicator of a signal from the wireless communication device 10. In this aspect, it suffices that the third threshold is, for example, −60 dBm or higher, that is, a level allowing communication even if a distance between the wireless communication device 10 and the wireless communication apparatus 20 or a communication state fluctuates to some extent, and is preferably −50 dBm or higher, that is, a level at which the distance between the wireless communication device 10 and the wireless communication apparatus 20 is relatively short and the communication state is relatively good. Note that the third threshold TH3 is not limited to this and may be set appropriately in consideration of (B) above.

The controller unit 26 in the wireless communication apparatus 20 is configured to perform connection to the wireless communication device 10 satisfying the condition (3) below instead of the condition (2) described above, that is, the wireless communication device 10 satisfying the condition (1) above and the condition (3) below.

(3) The maximum value of the received signal strength indicator of the signal received from the wireless communication device 10 is higher than or equal to the third threshold.

Further, the controller unit 26 may perform connection to a wireless communication device 10 satisfying the condition (5) below in addition to the condition (1) above and the condition (3) above.

(5) The identification (for example, a device name) included in the signal received from the wireless communication device 10 has been registered in the registration information stored in the server apparatus 30.

The connection operations by the wireless communication system 1 and the wireless communication apparatus 20 according to the second exemplary embodiment will then be described with reference to FIG. 4, FIG. 5, and FIG. 6.

First, as illustrated in FIG. 4, the controller unit 26 in the wireless communication apparatus 20 performs scanning for one of the wireless communication devices 10, like the first embodiment (S11 in FIG. 5).

In the scanning for the wireless communication device 10, the user brings the connection target wireless communication device 10 having been started and transmitted the advertising signal relatively close to and away from the wireless communication apparatus 20, that is, the connection target wireless communication device 10 is repeatedly brought relatively close to the wireless communication apparatus 20. This operation causes the received signal strength indicator of the signal received by the wireless communication apparatus 20 to increase and decrease, as illustrated in FIG. 6.

In the scanning for the wireless communication device 10, the controller unit 26 in the wireless communication apparatus 20 is configured to determine whether the condition (1) below and the condition (3) below are satisfied (S12 in FIG. 5).

(1) The increasing amount per unit time of the received signal strength indicator of the signal received from the wireless communication device 10 is higher than or equal to the first threshold TH1.

(3) The maximum value of the received signal strength indicator of the signal received from the wireless communication device 10 is higher than or equal to the third threshold.

Further, the controller unit 26 can be configured to perform connection to the wireless communication device 10 satisfying the condition (5) below in addition to the condition (1) above and the condition (3) above.

(5) The identification (for example, a device name) included in the signal received from the wireless communication device 10 has been registered in the registration information stored in the server apparatus 30.

If there is a wireless communication device 10 satisfying the condition (1) above and the condition (3) above (further, the condition (5) above), the controller unit 26 performs connection to the wireless communication device 10 (S13 in FIG. 5).

In the example in FIG. 6, the received signal strength indicator exceeds the third threshold TH3 at the start of the scanning. Thereafter, the received signal strength indicator decreases and then increases. When the increasing amount per unit time then exceeds the first threshold TH1, the wireless communication apparatus 20 performs connection to the wireless communication device 10. Note that the received signal strength indicator does not have to have exceeded the third threshold TH3 at the time of the connection. In addition, the third threshold TH3 may be set higher than a received signal strength indicator for a normal time.

When the wireless communication apparatus 20 and the wireless communication device 10 are connected, similar to the first embodiment described above, the display unit (e.g., notification unit) 29 in the wireless communication apparatus 20 can be configured to notify the user of the connection to the wireless communication device 10 (S14 in FIG. 5). The wireless communication device 10 may also notify the user of the connection to the wireless communication apparatus 20.

Also, similar to the first embodiment, the controller unit 26 may also instruct the wireless communication device 10 to notify the user that the wireless communication apparatus 20 and the wireless communication device 10 are connected at present. In accordance with the instruction from the wireless communication apparatus 20, the wireless communication device 10 may also notify again that the wireless communication device 10 is connected to the wireless communication apparatus 20 at present.

In contrast, if there is not a wireless communication device 10 satisfying the condition (1) above and the condition (3) above (further, the condition (5) above) in step S12 in FIG. 5, the controller unit 26 determines whether the predetermined time has elapsed since the scanning (S15 in FIG. 5). If the predetermined time has not elapsed since the scanning, the processing returns to step S12 described above, and the scanning is continued.

In contrast, if the predetermined time has elapsed since the scanning, the processing proceeds to step S16. In other words, if a wireless communication device satisfying the condition (1) above and the condition (3) above (further, the condition (5) above) is not found despite the scanning performed for the predetermined time, the controller unit 26 stops the connection standby state in which the standby for the connection to the wireless communication device is performed (S16 in FIG. 5).

When the connection standby state is stopped, the display unit (e.g., notification unit) 29 can be configured to notify the user that the connection standby state is stopped, like the first embodiment (S17 in FIG. 5).

As described above, according to the wireless communication apparatus 20 of the second exemplary embodiment, connection to the wireless communication device 10 satisfying the condition (1) below is performed in the scanning.

The increasing amount per unit time of the received signal strength indicator of the signal received from the wireless communication device 10 is higher than or equal to the first threshold TH1.

This configuration enables the wireless communication apparatus 20 to perform connection to:

(B) the connection target wireless communication device 10 brought relatively close to and away from the wireless communication apparatus 20 by the user intentionally. The connection to an unintended wireless communication device can thus be prevented.

According to the wireless communication apparatus 20 of the second exemplary embodiment, the connection to the wireless communication device 10 satisfying the condition (1) above and the condition (3) below is performed in the scanning.

(3) The maximum value of the received signal strength indicator of the signal received from the wireless communication device 10 is higher than or equal to the third threshold. Even if the received signal strength indicator is not stabilized and does not become high, wrong determination can thereby be decreased, and the connection determination accuracy can be improved. Accordingly, the connection to an unintended wireless communication device can be prevented more.

In addition, the wireless communication apparatus 20 of the second exemplary embodiment also provides the same benefits as those of the wireless communication apparatus 20 of the first exemplary embodiment described above.

Third Exemplary Embodiment

In the second exemplary embodiment described above, the wireless communication apparatus 20 performs the connection to the wireless communication device 10 satisfying the condition (1) below and the condition (3) below in the scanning.

The increasing amount per unit time of the received signal strength indicator of the signal received from the wireless communication device 10 is higher than or equal to the first threshold TH1.

The maximum value of the received signal strength indicator of the signal received from the wireless communication device 10 is higher than or equal to the third threshold.

In a third exemplary embodiment, in the scanning, the wireless communication apparatus 20 performs connection to a wireless communication device 10 satisfying a condition (4) below instead of the condition (3) above, that is, a wireless communication device 10 satisfying the condition (1) above and the condition (4) below.

(4) A change in which the received signal strength indicator of the signal received from the wireless communication device 10 exceeds a fifth threshold and a change in which the received signal strength indicator of the signal received from the wireless communication device 10 falls below a fourth threshold each occur at least one time.

The configurations of the wireless communication system 1 and the wireless communication apparatus 20 according to the third exemplary embodiment are the same as the configurations of the wireless communication system 1 and the wireless communication apparatus 20 according to the first exemplary embodiment and the second exemplary embodiment illustrated in FIG. 1 and FIG. 2 and as described above. However, it is noted that in the third exemplary embodiment, the functions and the operations of the controller unit 26 and the memory unit 24 in the wireless communication apparatus 20 are different from those in the second embodiment.

FIG. 7 is a view illustrating an example of the received signal strength indicator of a signal received by a wireless communication apparatus according to the third embodiment. In FIG. 7, the horizontal axis represents time, and the vertical axis represents received signal strength indicator (RSSI). As illustrated in FIG. 7, in the case of (B) above, the received signal strength indicator of the signal received by the wireless communication apparatus 20 increases and decreases.

Hence, in the third embodiment, both of an increase and a decrease of the received signal strength indicator are detected by using two thresholds, and thereby a connection target wireless communication device 10 brought relatively close to and away from the wireless communication apparatus 20 by the user intentionally as in (B) above is determined more reliably.

Specifically, the memory unit 24 in the wireless communication apparatus 20 stores a fourth threshold TH4 and a fifth threshold TH5 as the thresholds for determining whether to connect to the wireless communication device 10, instead of the third threshold TH3 described above. The fourth threshold TH4 and the fifth threshold TH5 relate to the received signal strength indicator of the signal from the wireless communication device 10, and the fifth threshold TH5 is higher than the fourth threshold TH4. It is noted that it suffices that the fourth threshold TH4 is, for example, −90 dBm or higher and is −50 dBm or lower, and preferably, is −80 dBm or higher and is −60 dBm or lower. Moreover, it suffices that the fifth threshold TH5 is −80 dBm or higher and is −40 dBm or lower, and preferably, is −70 dBm or higher and is −50 dBm or lower. In general, it should be appreciated that the fourth threshold TH4 and the fifth threshold TH5 are not limited to these and may be set appropriately in consideration of (B) above.

If the condition (4) below is satisfied instead of the conditions (3) described above, that is, if the condition (1) above and the condition (4) below are satisfied, the controller unit 26 in the wireless communication apparatus 20 performs connection to the wireless communication device 10.

(4) The change in which the received signal strength indicator of the signal received from the wireless communication device 10 exceeds the fifth threshold TH5 and the change in which the received signal strength indicator of the signal received from the wireless communication device 10 falls below the fourth threshold TH4 each occur at least one time.

Further, the controller unit 26 may also perform connection to a wireless communication device 10 satisfying the condition (5) below in addition to the condition (1) above and the condition (4) above.

(5) The identification (for example, a device name) included in the signal received from the wireless communication device 10 has been registered in the registration information stored in the server apparatus 30.

The connection operations by the wireless communication system 1 and the wireless communication apparatus 20 according to the third exemplary embodiment will then be described with reference to FIG. 4, FIG. 5, and FIG. 7.

First, as illustrated in FIG. 4, the controller unit 26 in the wireless communication apparatus 20 performs scanning for one of the wireless communication devices 10, like the second embodiment (S11 in FIG. 5).

Similar to the second embodiment, in the scanning for the wireless communication device 10, the user brings the connection target wireless communication device 10 having been started and transmitted the advertising signal relatively close to and away from the wireless communication apparatus 20, that is, repeatedly brings the connection target wireless communication device 10 relatively close to the wireless communication apparatus 20. This operation causes the received signal strength indicator of the signal received by the wireless communication apparatus 20 to increase and decrease, as illustrated in FIG. 7.

In the scanning for the wireless communication device 10, the controller unit 26 in the wireless communication apparatus 20 is then configured to determine whether the condition (1) below and the condition (4) below are satisfied (S12 in FIG. 5).

The increasing amount per unit time of the received signal strength indicator of the signal received from the wireless communication device 10 is higher than or equal to the first threshold TH1.

(4) The change in which the received signal strength indicator of the signal received from the wireless communication device 10 exceeds the fifth threshold TH5 and the change in which the received signal strength indicator of the signal received from the wireless communication device 10 falls below the fourth threshold TH4 each occur at least one time.

Further, the controller unit 26 may also be configured to perform connection to the wireless communication device 10 satisfying the condition (5) below in addition to the condition (1) above and the condition (4) above.

(5) The identification (for example, a device name) included in the signal received from the wireless communication device 10 has been registered in the registration information stored in the server apparatus 30.

If there is a wireless communication device 10 satisfying the condition (1) above and the condition (4) above (further, the condition (5) above), the controller unit 26 performs connection to the wireless communication device 10 (S13 in FIG. 5).

Similar to the second exemplary embodiment described above, when the wireless communication apparatus 20 and the wireless communication device 10 are connected, the display unit (e.g., notification unit) 29 in the wireless communication apparatus 20 can be configured to notify the user of the connection to the wireless communication device 10 (S14 in FIG. 5). The wireless communication device 10 may also notify the user of the connection to the wireless communication apparatus 20.

Moreover, similar to the second embodiment, the controller unit 26 may instruct the wireless communication device 10 to notify the user that the wireless communication apparatus 20 and the wireless communication device 10 are connected at present. In accordance with the instruction from the wireless communication apparatus 20, the wireless communication device 10 may also notify again that the wireless communication device 10 is connected to the wireless communication apparatus 20 at present.

In contrast, if there is not a wireless communication device 10 satisfying the condition (1) above and the condition (4) above (further, the condition (5) above) in step S12 in FIG. 5, the controller unit 26 determines whether the predetermined time has elapsed since the scanning (S15 in FIG. 5). If the predetermined time has not elapsed since the scanning, the processing returns to step S12 described above, and the scanning is continued.

In contrast, if the predetermined time has elapsed since the scanning, the processing proceeds to step S16. In other words, if a wireless communication device satisfying the condition (1) above and the condition (4) above (further, the condition (5) above) is not found despite the scanning performed for the predetermined time, the controller unit 26 stops the connection standby state in which the standby for the connection to the wireless communication device is performed (S16 in FIG. 5).

When the connection standby state is stopped, similar to the second embodiment, the display unit (e.g., notification unit) 29 may notify the user that the connection standby state is stopped (S17 in FIG. 5).

It is noted that the wireless communication apparatus 20 of the third exemplary embodiment also provides the same benefits as those of the wireless communication apparatus 20 of the second embodiment. The wireless communication apparatus 20 can thus perform connection to:

(B) the connection target wireless communication device 10 brought relatively close to and away from the wireless communication apparatus 20 by the user intentionally. The connection to an unintended wireless communication device can thus be prevented.

According to the wireless communication apparatus 20 of the third exemplary embodiment, connection to the wireless communication device 10 satisfying the condition (1) above and the condition (4) below is performed in the scanning (claim 4).

(4) The change in which the received signal strength indicator of the signal received from the wireless communication device 10 exceeds the fifth threshold TH5 and the change in which the received signal strength indicator of the signal received from the wireless communication device 10 falls below the fourth threshold TH4 each occur at least one time.

This configuration enables the wireless communication apparatus 20 to improve the accuracy in the determination of connection to:

(B) the connection target wireless communication device 10 brought relatively close to and away from the wireless communication apparatus 20 by the user intentionally. Accordingly, the connection to an unintended wireless communication device can be further prevented.

In addition, the wireless communication apparatus 20 of the third exemplary embodiment also provides the same benefits as those of the wireless communication apparatus 20 of the first embodiment and the second embodiment described above.

In general, it is noted that the exemplary embodiments of the present invention have heretofore been described. However, the present invention is not limited to the embodiments described above, and various changes, modifications, and combinations may be made. For example, in the first embodiment described above, the wireless communication apparatus 20 performs the connection to the wireless communication device 10 satisfying the condition (1) below and the condition (2) below in the scanning.

(1) The increasing amount per unit time of the received signal strength indicator of the signal received from the wireless communication device 10 is higher than or equal to the first threshold TH1.

(2) The received signal strength indicator of the signal received from the wireless communication device 10 is higher than or equal to the second threshold TH2.

However, it is noted that the present invention is not limited to this configuration, and the wireless communication apparatus may perform connection to a wireless communication device satisfying only the condition (1) above.

Likewise, in the second exemplary embodiment described above, the wireless communication apparatus 20 is configured to perform the connection to the wireless communication device 10 satisfying the condition (1) below and the condition (3) below in the scanning.

(1) The increasing amount per unit time of the received signal strength indicator of the signal received from the wireless communication device 10 is higher than or equal to the first threshold TH1.

(3) The maximum value of the received signal strength indicator of the signal received from the wireless communication device 10 is higher than or equal to the third threshold.

However, it is noted that the present invention is not limited to this, configuration and the wireless communication apparatus can be configured to perform connection to a wireless communication device satisfying only the condition (1) above.

Likewise, in the third embodiment described above, the wireless communication apparatus 20 performs the connection to the wireless communication device 10 satisfying the condition (1) below and the condition (4) below in the scanning.

(1) The increasing amount per unit time of the received signal strength indicator of the signal received from the wireless communication device 10 is higher than or equal to the first threshold TH1.

(4) The change in which the received signal strength indicator of the signal received from the wireless communication device 10 exceeds the fifth threshold and the change in which the received signal strength indicator of the signal received from the wireless communication device 10 falls below the fourth threshold each occur at least one time.

However, it is noted that the present invention is not limited to this configuration, and the wireless communication apparatus may be configured to perform connection to the wireless communication device satisfying only the condition (1) above.

In the embodiments described above, it should be appreciated that if there are two or more wireless communication devices satisfying the one or more connection conditions, the wireless communication apparatus may perform connection to all of the wireless communication devices satisfying the one or more connection conditions. In the case of connection to two or more wireless communication devices, the wireless communication apparatus may simultaneously perform the connection to the plurality of wireless communication devices or may perform the scanning and the connection to one of the plurality of wireless communication devices in turn.

Alternatively, if there are two or more wireless communication devices satisfying the one or more connection conditions, the wireless communication apparatus may selectively perform the connection to the wireless communication device having the highest maximum value of the signal strength.

REFERENCE SIGNS LIST

1 wireless communication system
5 network
10 wireless communication device
20 wireless communication apparatus
21 communication unit
22 communication unit
24 memory unit
26 controller unit
28 operation unit
29 display unit (notification unit)
30 server apparatus
40 storage medium
AP access point

The invention claimed is:

1. A wireless communication apparatus for wirelessly communicating with a wireless communication device, the wireless communication apparatus comprising:
   a controller unit configured to scan for the wireless communication device and to wirelessly connect to the wireless communication device; and
   a memory unit configured to store a first threshold for determining whether to connect to the wireless communication device and that relates to an increasing amount per unit time of a received signal strength indicator of a signal from the wireless communication device,
   wherein, while scanning for the wireless communication device, the controller unit is configured to connect to the wireless communication device when the increasing amount per unit time of the received signal strength indicator of the signal received from the wireless communication device is higher than or equal to the first threshold.

2. The wireless communication apparatus according to claim 1,
   wherein the memory unit is further configured to store a second threshold that is a threshold for determining whether to connect to the wireless communication device and that relates to the received signal strength indicator of the signal from the wireless communication device, and
   wherein, while scanning for the wireless communication device, the controller unit is configured to connect to the wireless communication device when the received signal strength indicator of the signal received from the wireless communication device is higher than or equal to the second threshold.

3. The wireless communication apparatus according to claim 1,
   wherein the memory unit is further configured to store a third threshold that is a threshold for determining whether to connect to the wireless communication device and that relates to the received signal strength indicator of the signal from the wireless communication device, and
   wherein, while scanning for the wireless communication device, the controller unit is configured to connect to the wireless communication device when a maximum value of the received signal strength indicator of the signal received from the wireless communication device is higher than or equal to the third threshold.

4. The wireless communication apparatus according to claim 1,
   wherein the memory unit is further configured to store a fourth threshold and a fifth threshold that are each a threshold for determining whether to connect to the wireless communication device, with the fourth and the fifth thresholds relating to the received signal strength indicator of the signal from the wireless communication device and the fifth threshold being higher than the fourth threshold, and wherein, while scanning for the wireless communication device, the controller unit is configured to connect to the wireless communication device when a change in which the received signal strength indicator of the signal received from the wireless communication device exceeds the fifth threshold and a change in which the received signal strength indicator of the signal received from the wireless communication device falls below the fourth threshold each occur at least one time.

5. The wireless communication apparatus according to claim 1, wherein, if the increasing amount per unit time of the received signal strength indicator of the signal received from the wireless communication device is not higher than or equal to the first threshold during a predetermined time, the controller unit is configured to stop a connection standby state in which a standby for connecting to the wireless communication device is performed.

6. The wireless communication apparatus according to claim 5, further comprising a notification unit configured to notify that the connection standby state is stopped.

7. A wireless communication system comprising:
the wireless communication apparatus according to claim 1; and
a server apparatus configured to communicate with the wireless communication apparatus,
wherein the signal received from the wireless communication device includes an identification of the wireless communication device,
wherein the server apparatus is configured to store the identification of the wireless communication device as registration information indicating that the wireless communication device has been registered, and
wherein, while scanning for the wireless communication device, the controller unit is configured to connect to the wireless communication device when the identification included in the signal received from the wireless communication device has been registered in the registration information stored in the server apparatus.

8. A wireless communication system comprising:
the wireless communication apparatus according to claim 1; and
a wireless communication device configured to wirelessly communicate with the wireless communication apparatus,
wherein when being connected to the wireless communication apparatus, the wireless communication device is configured to notify that the wireless communication device is connected to the wireless communication apparatus.

9. The wireless communication system according to claim 8,
wherein the controller unit in the wireless communication apparatus is configured to instruct the wireless communication device to notify that the wireless communication apparatus and the wireless communication device are currently connected, and
wherein, based on an instruction from the wireless communication apparatus, the wireless communication device is configured to notify that the wireless communication device is connected to the wireless communication apparatus.

10. A connection method for a wireless communication apparatus to connect to a wireless communication device, the method comprising:
scanning for the wireless communication device;
connecting to the wireless communication device when an increasing amount per unit time of a received signal strength indicator of a signal received from the wireless communication device is higher than or equal to a first threshold; and
controlling a controller unit to stop a connection standby state in which a standby for connecting to the wireless communication device is performed when the increasing amount per unit time of the received signal strength indicator of the signal received from the wireless communication device is not higher than or equal to the first threshold during a predetermined time.

11. The connection method according to claim 10, further comprising:
storing a second threshold that is a threshold for determining whether to connect to the wireless communication device and that relates to the received signal strength indicator of the signal from the wireless communication device; and
controlling the wireless communication apparatus to connect to the wireless communication device when the received signal strength indicator of the signal received from the wireless communication device is higher than or equal to the second threshold.

12. The connection method according to claim 10, further comprising:
storing a third threshold that is a threshold for determining whether to connect to the wireless communication device and that relates to the received signal strength indicator of the signal from the wireless communication device; and
controlling the wireless communication apparatus to connect to the wireless communication device when a maximum value of the received signal strength indicator of the signal received from the wireless communication device is higher than or equal to the third threshold.

13. The connection method according to claim 10, further comprising:
storing a fourth threshold and a fifth threshold that are each a threshold for determining whether to connect to the wireless communication device, with the fourth and the fifth thresholds relating to the received signal strength indicator of the signal from the wireless communication device and the fifth threshold being higher than the fourth threshold; and
controlling the wireless communication apparatus to connect to the wireless communication device when a change in which the received signal strength indicator of the signal received from the wireless communication device exceeds the fifth threshold and a change in which the received signal strength indicator of the signal received from the wireless communication device falls below the fourth threshold each occur at least one time.

14. The connection method according to claim 10, further comprising notifying that the connection standby state is stopped.

15. A non-transitory computer readable storage medium having a program that, when executed by a processor of a computer, causes the computer to:
scan for a wireless communication device;

connect to the wireless communication device when an increasing amount per unit time of a received signal strength indicator of a signal received from the wireless communication device is higher than or equal to a first threshold;

store, in memory, a second threshold that is a threshold for determining whether to connect to the wireless communication device and that relates to the received signal strength indicator of the signal from the wireless communication device; and connect to the wireless communication device when the received signal strength indicator of the signal received from the wireless communication device is higher than or equal to the second threshold.

16. The non-transitory computer readable storage medium according to claim 15, wherein, when executed by the processor of the computer, further causes the computer to:

store, in the memory, a third threshold that is a threshold for determining whether to connect to the wireless communication device and that relates to the received signal strength indicator of the signal from the wireless communication device; and cause the computer to connect to the wireless communication device when a maximum value of the received signal strength indicator of the signal received from the wireless communication device is higher than or equal to the third threshold.

17. The non-transitory computer readable storage medium according to claim 15, wherein, when executed by the processor of the computer, further causes the computer to:

store, in the memory, a fourth threshold and a fifth threshold that are each a threshold for determining whether to connect to the wireless communication device, with the fourth and the fifth thresholds relating to the received signal strength indicator of the signal from the wireless communication device and the fifth threshold being higher than the fourth threshold; and cause the computer to connect to the wireless communication device when a change in which the received signal strength indicator of the signal received from the wireless communication device exceeds the fifth threshold and a change in which the received signal strength indicator of the signal received from the wireless communication device falls below the fourth threshold each occur at least one time.

18. The non-transitory computer readable storage medium according to claim 15, wherein the program, when executed by the processor of the computer, causes the computer to stop a connection standby state in which a standby for connecting to the wireless communication device is performed when the increasing amount per unit time of the received signal strength indicator of the signal received from the wireless communication device is not higher than or equal to the first threshold during a predetermined time.

* * * * *